UNITED STATES PATENT OFFICE 2,107,898

AZO COMPOUNDS AND PROCESS FOR DYEING THEREWITH

James G. McNally and Joseph B. Dickey, Rochester, N. Y., assignors, by mesne assignments, to Eastman Kodak Company, Jersey City, N. J., a corporation of New Jersey No Drawing. Application May 6, 1936,
Serial No. 78,170

14 Claims. (Cl. 8—5)

This invention relates to new aryl azo compositions. More particularly it relates to water soluble aryl azo compounds suitable for the coloration of organic derivatives of cellulose, silk or wool, by dyeing, printing or stenciling, as well as for the union dyeing of materials containing these substances. The invention includes the new aryl azo compounds, the process for their manufacture, the process of dyeing with the water soluble azo compounds of the invention and materials dyed with the new azo compounds.

While the new aryl azo compounds may be used for coloring organic derivatives of cellulose, silk or wool, they are particularly adapted for coloring cellulose acetate, especially cellulose acetate silk, and it is in this connection that they have been found to be of greatest importance.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed organic acid esters of cellulose, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate and the cellulose ethers, such as methyl cellulose, ethyl cellulose or benzyl cellulose.

The term "cellulose acetate" as used herein is intended to include such acetylated cellulose products as are characterized by an indifferent affinity for the usual cotton or wool dyes, especially the ordinary water soluble dyes. More particularly, it refers to acetate silk made from a cellulose acetate product having an acetylation value higher than cellulose diacetate and lower than cellulose triacetate but, as just noted, the term cellulose acetate is not restricted to this more limited meaning.

The aryl azo compounds of our invention can be prepared by coupling nuclear non-sulfonated aryl diazonium salts with compounds having the general formula:

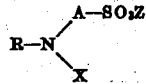

wherein A represents an alkylene group other than a methylene group, R represents a nuclear non-sulfonated aryl group, X represents hydrogen, an alkyl, a cycloalkyl, a nuclear non-sulfonated aryl or a nuclear non-sulfonated heterocyclic group and Z represents hydrogen, an alkali-forming metal or an ammonium radical.

Referring more particularly to the constituents which go to form the compounds having the general formula above given, A represents an alkylene group which advantageously can be an ethylene, a methylethylene, a propylene or a butylene group, R represents a nuclear non-sulfonated aryl group, advantageously of the benzene or naphthalene series, such as phenyl, chlorophenyl, hydroxyphenyl, nitrophenyl, alkoxyphenyl, diphenyl, alkoxytolyl, naphthyl or nitronaphthyl. X represents a hydrogen atom or an alkyl group which can advantageously be a methyl, an alkoxymethyl, ethyl, propyl, butyl, hexyl, a sulfonated ethyl group, such as:

—CH₂—CH₂—SO₂OH or —CH₂—CH₂—SO₂ONa or a higher alkyl sulfonated group such as:

—CH₂—CH₂—CH₂—CH₂—SO₂OH or

—CH₂—CH₂—CH₂—CH₂—SO₂ONH₄

X can also be a nuclear non-sulfonated aryl group preferably of the benzene or naphthalene series, such as phenyl, chlorophenyl, nitrophenyl, alkoxyphenyl, naphthyl or nitronaphthyl. Likewise X can be a cycloalkyl group, such as cyclohexyl or tetrahydronaphthyl or a heterocyclic group such as tetrahydrofuryl. Z can be a hydrogen atom, an alkali-forming metal, such as sodium, potassium or calcium, an ammonium radical derived from ammonia or a substituted ammonia (i.e. a basic amine) such as methylamine, dimethylamine, trimethylamine, ethylamine, β-hydroxyethylamine, di-β-hydroxyethylamine, butylamine, benzyl amine, pyridine or the like, or a quaternary ammonium radical such as tetramethyl ammonium tetraethylammonium or the like.

The compounds of our invention can be prepared by diazotizing a nuclear non-sulfonated aromatic amine in an acid medium and coupling it with a compound of the general formula above described. Their probable structural formula is as follows:

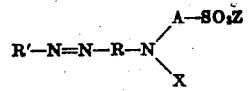

wherein R' represents a nuclear non-sulfonated aryl nucleus which may be substituted and R, A, X and Z have the meaning previously assigned to them.

The compounds of our invention are characterized in at least two important respects. One, they are soluble in water and, two, they are stable to heat and may be subjected to comparatively high temperatures without undergoing decomposition. Because of their solubility in water they may be used for dyeing without the necessity of employing dispersing agents. As a general rule, it may be stated that their solubility in water decreases with increase in the number of carbon atoms in the alkylene group attached to the sulphonic acid group. Similarly, as a general rule, the solubility in water decreases with increase in the molecular weight of the substituent represented by X.

We are aware that it is known from English Patent No. 11,343 of 1899 to prepare compounds having the general formula:

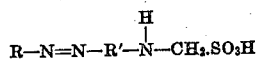

$$R-N=N-R'-\overset{H}{N}-CH_2.SO_3H$$

wherein R and R', respectively, indicate aryl groups or nuclei, by combination of diazo compounds with the methyl-omega-sulphonic acids derived from primary amines; that is, amines having a hydrogen atom replaced by the methyl-omega-sulphonic acid. Similarly we are aware from the United States Patents Nos. 1,483,797 and 1,483,798 to Green and Saunders that azo compounds having omega-sulphonic acids other than methyl-omega-sulphonic acid are known and are stated to be of use for dyeing acetyl cellulose.

The azo-sulphonic acid compounds of our invention are distinguished from the omega-sulphonic acid compounds disclosed by the prior art in that, as stated in the patents to Green and Saunders, the omega-sulphonic acid groups split off during the dyeing operation, whereas in the azo compounds of our invention the sulphonic acid group does not split off during the dyeing operation. Dissociation of the omega-sulphonic acids is stated to occur in "hot aqueous solution especially if it be slightly acid or slightly alkaline." Such dissociation does not occur in the case of the azo compounds of our invention. Again, the azo compounds of this invention are further distinguished in that they possess high stability to heat, whereas the corresponding azo compounds having omega-sulphonic acid groups, are usually relatively unstable to heat.

The new coupling component of our invention

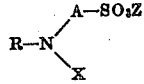

$$R-N\begin{matrix}A-SO_2Z\\X\end{matrix}$$

is prepared by heating an arylamine having the structural formula

$$R-N\begin{matrix}H\\X\end{matrix}$$

where R represents a nuclear non-sulfonated aryl group, advantageously of the benzene or naphthalene series, such as phenyl, chlorophenyl, hydroxyphenyl, nitrophenyl, alkoxyphenyl, diphenyl alkoxynaphthyl, or nitronaphthyl and X has the meaning previously given it, with B—SO₃Z where B represents a halogen substituted alkylene group other than methylene and in which Z represents hydrogen, an alkali-forming metal or an ammonium radical. Thus, for example, the coupling component methyl-β-sulfoethyl aniline can be prepared by heating one mole of methyl aniline and one mole of β-bromoethane sulfonate at a temperature of about 150° C.

Our invention will be more fully understood by reference to the following examples, in which the quantities are stated in parts by weight:

*Example 1*

17.2 parts of p-bromoaniline are dissolved in 150 parts of water and about 26 parts of 36% hydrochloric acid. The solution is cooled to 0°–5° C. by the addition of ice or by external cooling. 6.9 parts of sodium nitrite dissolved in water are added with stirring and the p-bromoaniline diazotized while maintaining the temperature at about 0°–5° C.

23.7 parts of methyl-β-sulfoethylaniline are dissolved in acetic acid and the diazotized solution formed above is added while stirring and maintaining a temperature of 0°–5° C. Sodium acetate is then added until the solution is no longer acid to Congo red paper and the azo compound of p-bromo-aniline and methyl-β-sulfoethylaniline precipitated as the sodium salt by the addition of sodium chloride, filtered and dried.

*Example 2*

27.3 parts of β-sulfoethyl-α-naphthylamine are dissolved in a minimum amount of acetic acid and the diazonium salt, prepared as described in Example 1, added. Ethanolamine is then added until the resulting solution is no longer acid to Congo red paper. After coupling is complete, the resulting azo compound is precipitated as the ethanolamine salt by the addition of sodium chloride, filtered and dried. By the substitution of sodium acetate for ethanolamine, the sodium salt of the azo compound can be obtained.

*Example 3*

16.8 parts of 2-methoxy-4-nitroaniline are dissolved by warming in 200 parts of water containing about 35 parts of 36% hydrochloric acid and diazotized in the usual manner by adding 6.9 parts of sodium nitrite dissolved in a small amount of water.

23.7 parts of methyl-β-sulfoethylaniline are dissolved in a minimum quantity of acetic acid and the diazonium salt added. The resulting solution is then made neutral to Congo red paper by the addition of pyridine. When coupling is complete the pyridine salt of the resulting azo compound is precipitated with salt, filtered and dried. The sodium salt of the azo compound can be prepared by substituting sodium acetate for pyridine.

*Example 4*

27.3 parts of β-sulfoethyl-α-naphthylamine are dissolved in acetic acid, preferably the minimum amount, and the diazonium salt, prepared as described in Example 3, is added. The solution is then made neutral to Congo red paper with sodium acetate, and after reaction is complete the azo compound of 2-methoxy-4-nitroaniline and β-sulfoethyl-α-naphthylamine is precipitated as the sodium salt with sodium chloride, filtered and dried.

*Example 5*

A. 7.6 parts of powdered sodium nitrite are dissolved in 97.5 parts of cold 100% sulfuric acid, and after the addition, the solution is warmed to not over 70° C. after which it is cooled to 10–15° C.

B. 18.3 parts of 2,4-dinitroaniline are dissolved in 231 parts of hot glacial acetic acid, and the resulting solution cooled as rapidly as possible to room temperature.

The mixture prepared in B is added to the solution prepared in A over a period of 30-45 minutes, while stirring, and maintaining a temperature of 10°-15° C. The resulting solution is stirred for about an additional 30 minutes, and one part of urea is added to remove excess nitrous acid.

23.7 parts of methyl-β-sulfoethyl-α-naphthylamine are dissolved in a minimum amount of acetic acid, and coupled in the usual manner with the diazo solution prepared above. After coupling is complete the resulting azo compound is precipitated with salt, filtered and dried.

Example 6

27.3 parts of β-sulfoethyl-α-naphthylamine are dissolved in a minimum amount of acetic acid and coupled in the usual manner with the diazonium salt prepared as described in Example 5. After coupling is complete, the solution is neutralized with calcium carbonate and the calcium salt of 2,4 dinitroaniline azo-β-sulfoethyl-α-naphthylamine is precipitated by the addition of sodium chloride, filtered and dried. The sodium salt of the azo compound can be obtained, if desired, by effecting neutralization of the solution with sodium acetate in place of calcium carbonate.

Example 7

7.2 parts of sodium nitrite are slowly added to 114 parts of cold 100% sulfuric acid. The resulting solution is cooled and 22.8 parts of 2,4,6-trinitroaniline in finely-powdered form are added. The suspension is cooled and stirred for one hour, and then at room temperature for 10-12 hours until it no longer shows an excess of nitrous acid when tested with starch potassium iodide paper.

The diazo salt thus prepared is added to 23.7 parts of methyl-β-sulfoethylaniline, dissolved in a minimum amount of acetic acid and coupling is effected in the usual manner. When coupling is complete, the mixture is poured into water, made neutral to Congo red paper with sodium acetate, after which the azo compound is precipitated with sodium chloride, filtered and dried.

Example 8

13.5 parts of p-aminoacetophenone are dissolved in 150 parts of water containing about 30 parts of 36% hydrochloric acid and diazotized in the usual manner by the addition of 6.9 parts of sodium nitrite.

32.3 parts of ammonium-γ-sulfopropylbutylmetachloroaniline are dissolved in water. Preferably a minimum amount of water is used. The resulting solution is then iced or otherwise cooled to a temperature of about 0° C. and the diazo solution prepared above is added slowly with stirring. Concurrently with the addition of the diazo solution there is added a water solution of sodium acetate, sodium carbonate or sodium bicarbonate in amount sufficient to keep the mixture just neutral to Congo red paper. When coupling is complete, the azo compound is precipitated by addition of salt, or in any suitable manner, filtered and dried.

Example 9

A. 7.6 parts of sodium nitrite are dissolved in 97.5 parts of cold 100% sulfuric acid and after the addition, the solution is warmed to not over 70° C. and then cooled to 10-15° C.

B. 26.2 parts of 2,4-dinitro-6-bromoaniline are dissolved in 241 parts of hot glacial acetic acid and the resulting solution is then cooled as rapidly as possible to room temperature.

The mixture prepared in B is added to the solution prepared in A over a period of 30-40 minutes, while stirring, and maintaining a temperature of 10-15° C. The resulting solution is stirred for about an additional 30 minutes, and one part of urea is added to remove excess nitrous acid.

The diazo solution thus prepared is added slowly to a cold water solution of sodium-γ-sulfopropyl-β-hydroxypropylcresidine, and coupling is carried out as described in Example 8. When coupling is complete, the sodium salt of the azo compound is precipitated by the addition of sodium chloride, filtered and dried.

Example 10

38.1 parts of sodium-α-sulfobutylamyl[β-methoxy]-α-naphthylamine are dissolved in water and coupled with the diazo solution prepared as described in Example 9. The coupling may be effected as described in Example 8. Upon the completion of coupling, the azo compound is precipitated, filtered and dried.

In the above examples, the azo compounds, except as noted, are isolated as the sodium salts. These can as well be isolated as the potassium salts by substituting potassium acetate for sodium acetate in the examples. The free sulfonic acid form of the azo compounds can be prepared by treating the sodium salts with hydrochloric acid and precipitating the resulting free acids by the addition of sodium chloride. The ammonium type salts of the so-prepared free acid forms of the azo compounds can be prepared by treating the free acid form with the appropriate ammonium base or salt, for example an ammonium hydroxide or an ammonium carbonate.

The foregoing examples illustrate the manner of preparation of the azo compounds of our invention, but it will be understood that the invention is not limited to the specific conditions described as various modifications within the scope of the invention can be made. For example, the acetic acid used in Examples 1, 2, 3, 4, 6 and 7 may be of varying strength and, while it is generally advantageous to use no more than is required for solution purposes, an excess may be employed. Similarly, another acid, such as hydrochloric acid, for example may be used in place of acetic acid.

Example 11

A. 20.8 parts of 2,6-dichloro-p-nitroaniline are dissolved in 231 parts of hot glacial acetic acid, and the resulting solution is then cooled rapidly to room temperature.

B. 7.6 parts of sodium nitrite are dissolved in 97.5 parts of 100% sulfuric acid and warmed to 70° C., after which the resulting solution is cooled to 10-15° C.

The mixture prepared in A is added to the solution prepared in B over a period of about thirty minutes, while stirring, and maintaining a temperature of 10-15° C. Stirring is continued for one hour at room temperature, and then one part of urea is added to remove any excess nitrous acid.

20.8 parts of the sodium salt of cyclohexyl-γ-sulfopropylaniline—

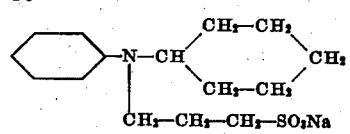

are dissolved in a minimum amount of water. The resulting solution is then cooled by the addition of ice, for example, and the diazo solution prepared as described above is added slowly with stirring. Concurrently with the addition of the diazo solution, sufficient sodium carbonate solution is added, so that the mixture is but slightly acid to litmus. After a short time the mixture is made neutral to litmus, and when the coupling reaction is complete, the azo compound formed is precipitated in any suitable manner, filtered, washed and dried.

*Example 12*

29.3 parts of the sodium salt of methyltetrahydrofuryl-β-sulfoethylaniline—

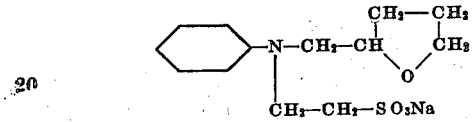

are dissolved in a minimum amount of water and coupled in the usual manner with a diazo solution prepared by diazotizing 23.9 parts of 3-nitro-5-bromo-4-aminoacetophenone. When coupling is complete, the sodium salt of the azo compound formed is precipitated by the addition of sodium chloride, filtered, washed and dried.

*Example 13*

33.4 parts of the sodium salt of methylthiazolinyl-γ-sulfopropylaniline—

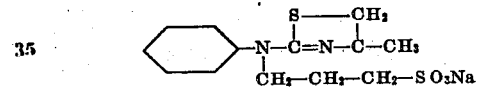

are dissolved in a minimum amount of water. The resulting solution is then cooled in any suitable manner to a temperature of 0–5° C. and coupled with a diazo solution prepared by diazotizing 26.4 parts of p-nitro-o-iodoaniline. When coupling is complete, the azo compound formed may be precipitated in the form of its sodium salt by the addition of sodium chloride. The salt may be recovered by filtering, after which it may be washed and dried.

*Example 14*

21.7 parts of p-nitro-o-bromoaniline are added to 200 parts of water containing about 36 parts of 36% hydrochloric acid and a small amount of ice, and diazotized by addition of 6.9 parts of sodium nitrite.

37.8 parts of p-bromophenyl-β-sulfoethylaniline—

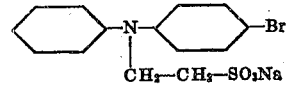

are dissolved in a minimum amount of cold water. The diazo solution prepared as described above is then added, with stirring, and coupling is effected by neutralizing the hydrochloric acid present with sodium acetate or sodium carbonate, for example. When coupling is complete, the resulting azo compound may be obtained in the form of its sodium salt by the addition of sodium chloride and recovered by filtering, washing and drying. The compound has the probable formula—

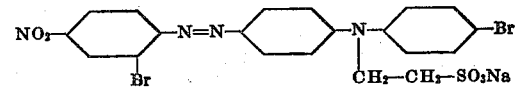

and dyes cellulose acetate rubine from an aqueous solution which may contain salt.

Our invention will be further illustrated by the following tabulation, which gives the composition of a number of the water-soluble azo compounds of our invention, together with the color they produce on cellulose acetate, silk, or wool:

| Amine | Coupling Component | Color on Acetate | Color on Silk | Color on Wool |
|---|---|---|---|---|
| 2-methoxy-4-nitroaniline | Methyl-β-sulfoethyl aniline sodium salt | Red | Red | Red. |
| Do | N-β-sulfoethyldiphenylamine sod. salt | do | do | Do. |
| Do | Methyl-β-sulfoethyl-α-naphthylamine | Purple | Purple | Purple. |
| Do | β-Sulfoethyl-α-naphthylamine | do | do | Do. |
| p-Nitroaniline | Methyl-β-sulfoethyl aniline sodium salt | Red | Red | Red. |
| Do | N-β-Sulfoethyldiphenylamine sod. salt | do | do | Do. |
| Do | Methyl-β-sulfoethyl-α-naphthylamine | do | do | Do. |
| Do | β-Sulfoethyl-α-naphthylamine | do | do | Do. |
| o-Nitroaniline | Methyl-β-sulfoethyl aniline sodium salt | Orange | Orange | Orange. |
| Do | N-β-Sulfoethyldiphenylamine sod. salt | do | do | Do. |
| Do | Methyl-β-sulfoethyl-α-naphthylamine | Orange-red. | Orange-red. | Orange-red. |
| Do | β-Sulfoethyl-α-naphthylamine | do | do | Do. |
| o-Chloroaniline | Methyl-β-sulfoethyl aniline sodium salt | Yellow | Yellow | Yellow. |
| Do | N-β-Sulfoethyldiphenylamine sod. salt | do | do | Do. |
| Do | Methyl-β-sulfoethyl-α-naphthylamine | Orange | Orange | Orange. |
| Do | β-Sulfoethyl-α-naphthylamine | do | do | Do. |
| 4-chloro-2-aminoanisole | Methyl-β-sulfoethyl aniline sodium salt | Orange-yellow. | Orange-yellow. | Orange-yellow. |
| Do | N-β-Sulfoethyldiphenylamine sod. salt | do | do | Do. |
| Do | Methyl-β-sulfoethyl-α-naphthylamine | Orange | Orange | Orange. |
| Do | β-Sulfoethyl-α-napthylamine | do | do | Do. |
| 4-nitro-2-aminotoluene | Methyl-β-sulfoethyl aniline sodium salt | do | do | Do. |
| Do | N-β-sulfoethyldiphenylamine sod. salt | do | do | Do. |
| Do | Methyl-β-sulfoethyl-α-naphthylamine | Orange-red. | Orange-red. | Orange-red. |
| Do | β-Sulfoethyl-α-naphthylamine | do | do | Do. |
| p-Chloro-o-nitroaniline | Methyl-β-sulfoethyl aniline sodium salt | Orange | Orange | Orange. |
| Do | N-β-sulfoethyldiphenylamine sod. salt | do | do | Do. |
| Do | Methyl-β-sulfoethyl-α-naphthylamine | Orange-red. | Orange-red. | Orange-red. |
| Do | β-Sulfoethyl-α-napthylamine | do | do | Do. |
| p-Aminoacetophenone | Methyl-β-sulfoethyl aniline sodium salt | Orange | Orange | Orange. |
| Do | N-β-sulfoethyldiphenylamine sod. salt | do | do | Do. |
| Do | Methyl-β-sulfoethyl-α-naphthylamine | Orange-red. | Orange-red. | Orange-red. |
| Do | β-Sulfoethyl-α-naphthylamine | do | do | Do. |

| Amine | Coupling Component | Color on Acetate | Color on Silk | Color on Wool |
|---|---|---|---|---|
| α-Naphthylamine | Methyl-β-sulfoethyl aniline sodium salt. | Orange | Orange | Orange. |
| Do | N-β-sulfoethyldiphenylamine sod. salt | do | do | Do. |
| Do | Methyl-β-sulfoethyl-α-naphthylamine | Red | Red | Red. |
| Do | β-Sulfoethyl-α-naphthylamine | do | do | Do. |
| 2, 4-dinitroaniline | Methyl-β-sulfoethyl aniline sodium salt. | Red | Red | Red. |
| Do | N-β-sulfoethyldiphenylamine sod. salt | do | do | Do. |
| Do | Methyl-β-sulfoethyl-α-naphthylamine | Reddish-blue. | Reddish-blue. | Reddish-blue. |
| Do | β-Sulfoethyl-α-naphthylamine | do | do | Do. |
| 2, 4, 6-trinitroaniline | Methyl-β-sulfoethyl aniline sodium salt. | Red | Red | Red. |
| Do | N-β-sulfoethyldiphenylamine sod. salt | do | do | Do. |
| Do | Methyl-β-sulfoethyl-α-naphthylamine | Blue-green. | Blue-green. | Blue-green. |
| Do | β Sulfoethyl-α-naphthylamine | do | do | Do. |
| 2, 4-dinitro-6-bromoaniline | Methyl-β-sulfoethyl aniline sodium salt. | Red | Red | Red. |
| Do | N-β-sulfoethyldiphenylamine sod. salt | do | do | Do. |
| Do | Methyl-β-sulfoethyl-α-naphthylamine | Blue | Blue | Blue. |
| Do | β-Sulfoethyl-α-naphthylamine | do | do | Do. |
| p-Nitro-o-chloroaniline | Ammonium-γ-sulfopropyl-butyl-m-chloroaniline. | Rubine | Rubine | Rubine. |
| p-Aminoacetophenone | do | Orange | Orange | Orange. |
| 2, 4-dinitroaniline | do | Purple | Purple | Purple. |
| 2, 4-dinitro-6-bromoaniline | Sodium - γ - sulfopropyl - β - hydroxypropylcresidine. | Reddish-blue. | Reddish-blue. | Reddish-blue. |
| 2, 4-6-trinitroaniline | do | Blue | Blue | Blue. |
| 2, 4-dinitro-6-haloaniline | Sodium-d-sulfobutylamyl (β-alkoxy or alkyl or halo)-α-naphthylamine. | do | do | Do. |
| 2, 4-dinitro-6-carbethoxy aniline | do | do | do | Do. |
| Do | Sodium-γ-sulfopropylbutyl-α-naphthylamine. | do | do | Do. |

It will be noted that, as the azo compounds of our invention are water soluble, they are suitable for the direct coloration of organic derivatives of cellulose, silk and wool, or mixtures of these materials. The dyeing operations will be conducted in accordance with the usual dyeing practice, salt being added, if desired, to facilitate exhaustion of the dye bath. Dyeing can be carried out as follows:

*Example 15*

2.5 parts (by weight) of the dye prepared by diazotizing 2-methoxy-4-nitroaniline and coupling it with methyl-β-sulfoethylaniline sodium salt are dissolved in 230 parts of water and the mixture heated to about 80–85° C. and maintained at this temperature throughout the dyeing operation. 100 parts of cellulose acetate (i. e., acetate silk) are added and allowed to remain in the dye bath, salt being added as desired to promote exhaustion of the dye bath, until dyeing is complete, after which the silk is removed, washed with soap, rinsed and dried. The cellulose acetate is dyed a red color.

Silk or wool or mixtures of either or both of these with organic derivatives of cellulose, cellulose acetate, for example, may be substituted for cellulose acetate in the foregoing example, and similarly dyed. In general about 2.5 parts of dye per 100 parts of the material to be dyed will be used, but this proportion is subject to variation, as are the amount of water and temperature at which the dyeing operation is conducted. The amount of salt added will vary with different dyes of this series and the depth of shade required, but in general it will vary between 10 and 50 per cent of the weight of the cloth being dyed, although greater or lesser amounts may be used if desired.

It will be understood that the examples given are intended to be illustrative and not limiting of the invention. Thus other dyes than the specific dyes shown may be prepared. Similarly the invention is not limited to the specific conditions set forth illustrating how the new dyes may be prepared and how they may be used for dyeing as these are subject to modification.

What we claim as our invention and desire to secure by Letters Patent of the United States is:

1. A compound consisting of a nuclear non-sulfonated aryl nucleus linked to a second nuclear non-sulfonated aryl nucleus by an azo group, the compound containing as a nuclear substituent at least one group of the following structure:

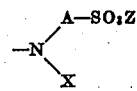

wherein A represents an alkylene group other than a methylene group, X represents hydrogen, an alkyl, a cycloalkyl, a nuclear non-sulfonated aryl or a nuclear non-sulfonated heterocyclic group and Z represents hydrogen, an alkali-forming metal or an ammonium radical.

2. The water-soluble salts of the azo compounds represented by the general formula:

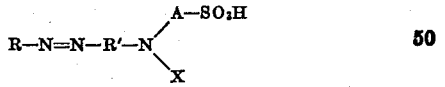

wherein R and R' represent nuclear non-sulfonated aryl nuclei, A represents an alkylene group other than methylene, and X represents hydrogen, an alkyl group, a cycloalkyl group, a nuclear non-sulfonated heterocyclic group or a nuclear non-sulfonated aryl group.

3. A process for the coloration of organic derivatives of cellulose, silk or wool which comprises applying thereto a water solution of an azo dye having the general formula:

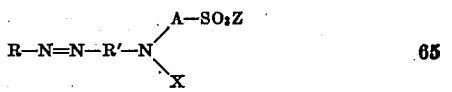

wherein R and R' represent nuclear non-sulfonated aryl nuclei, A represents an alkylene group other than methylene, X represents hydrogen, an alkyl group, a cycloalkyl group, a nuclear non-sulfonated heterocyclic group or a nuclear non-sulfonated aryl group and Z represents hydrogen, an alkali-forming metal or an ammonium radical.

4. The process of coloring cellulose acetate which comprises effecting coloration by applying thereto an azo dye having the general formula:

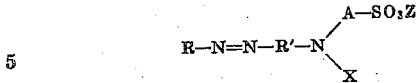

wherein R and R' represent nuclear non-sulfonated aryl nuclei, A represents an alkylene group other than methylene, X represents hydrogen, an alkyl group, a cycloalkyl group, a nuclear non-sulfonated heterocyclic group or a nuclear non-sulfonated aryl group and Z represents hydrogen, an alkali-forming metal or an ammonium radical.

5. A process for coloring mixed fabrics comprising organic derivatives of cellulose and a material selected from the group consisting of silk and wool which comprises effecting coloration by applying thereto an azo dye having the general formula:

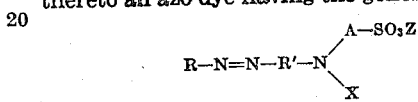

wherein R and R' represent nuclear non-sulfonated aryl nuclei, A represents an alkylene group other than methylene, X represents hydrogen, an alkyl group, a cycloalkyl group, a nuclear non-sulfonated heterocyclic group or a nuclear non-sulfonated aryl group and Z represents hydrogen, an alkali-forming metal or an ammonium radical.

6. A process of preparing azo compounds which comprises coupling a diazotized aromatic amine of the benzene or naphthalene series with an aryl nucleus of the benzene or naphthalene series containing as a nuclear substituent a group of the following structure:

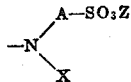

wherein A represents an alkylene group other than methylene, X represents hydrogen, an alkyl group, a cycloalkyl group, a nuclear non-sulfonated heterocyclic group or a nuclear non-sulfonated aryl group and Z represents hydrogen, an alkali-forming metal or an ammonium radical.

7. The water-soluble salts of the azo compounds represented by the general formula:

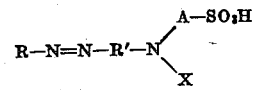

wherein R and R' each represents a nuclear non-sulfonated aryl nucleus of the benzene series, A represents an alkylene group other than methylene and X represents a member selected from the class consisting of hydrogen, an alkyl group, a cycloalkyl group, a nuclear non-sulfonated heterocyclic group and a nuclear non-sulfonated aryl group.

8. The water-soluble azo compounds represented by the general formula:

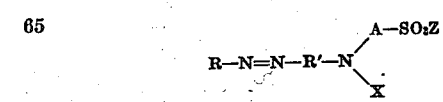

wherein R and R' each represents a nuclear non-sulfonated aryl nucleus, A represents an alkylene group other than methylene, X represents a member selected from the class consisting of hydrogen, an alkyl group, a cycloalkyl group, a nuclear non-sulfonated aryl group and a nuclear non-sulfonated heterocyclic group and Z represents a member selected from the class consisting of hydrogen, an alkali-forming metal and an ammonium radical.

9. A process for the coloration of organic derivatives of cellulose, which comprises applying thereto a water solution of an azo dye having the general formula:

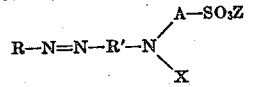

wherein R and R' each represents a nuclear non-sulfonated aryl nucleus of the benzene series, A represents an alkylene group other than methylene, X represents a member selected from the class consisting of hydrogen, an alkyl group, a cycloalkyl group, a nuclear non-sulfonated heterocyclic group and a nuclear non-sulfonated aryl nucleus of the benzene series, and Z represents a member selected from the class consisting of hydrogen, an alkali-forming metal and an ammonium radical.

10. The process of coloring cellulose acetate which comprises effecting coloration by applying thereto an azo dye having the general formula:

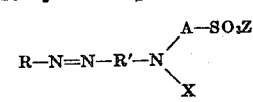

wherein R and R' each represents a nuclear non-sulfonated aryl nucleus of the benzene series, A represents an alkylene group other than methylene, X represents a member selected from the class consisting of hydrogen, an alkyl group, a cycloalkyl group, a nuclear non-sulfonated heterocyclic group and a nuclear non-sulfonated aryl nucleus of the benzene series and Z represents a member selected from the class consisting of hydrogen, an alkali-forming metal and an ammonium radical.

11. The process of coloring a cellulose acetate which comprises effecting coloration by applying thereto on azo dye having the general formula:

$$R-N=N-R'-N\diagdown_{X}^{A-SO_3Z}$$

wherein R and R' each represents a nuclear non-sulfonated aryl nucleus of the benzene series, A represents an alkylene group other than methylene, X represents a member selected from the class consisting of hydrogen, an alkyl group, a cycloalkyl group, a nuclear non-sulfonated heterocyclic group and a nuclear non-sulfonated aryl nucleus of the benzene series, and Z represents a member selected from the class consisting of hydrogen, an alkali-forming metal and an ammonium radical.

12. The process for coloring mixed fabrics comprising organic derivatives of cellulose and a material selected from the group consisting of silk and wool which comprises effecting coloration by applying thereto an azo dye having the general formula:

$$R-N=N-R'-N\diagdown_{X}^{A-SO_3Z}$$

wherein R and R' each represents a nuclear non-sulfonated aryl nucleus of the benzene or naphthalene series, A represents an alkylene group other than methylene, X represents a member selected from the class consisting of hydrogen, an alkyl group, a cyclo alkyl group, a nuclear non-sulfonated heterocyclic group and a nuclear non-sulfonated aryl nucleus of the benzene or naphthalene series and Z represents hydrogen, an alkali-forming metal or an ammonium radical.

13. The water soluble azo compounds represented by the general formula:

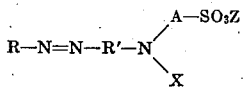

wherein R and R' each represents a nuclear non-sulfonated aryl nucleus, A represents an alkylene group other than methylene, X represents a cycloalkyl group, and Z represents hydrogen, an alkali-forming metal or an ammonium radical.

14. The water soluble azo compounds represented by the general formula:

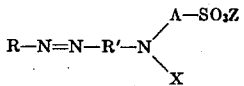

wherein R represents a nuclear non-sulfonated aryl nucleus of the benzene series containing no nitro group, R' represents a nuclear non-sulfonated aryl nucleus of the benzene series, A represents an alkylene group other than methylene, X represents a member selected from the class consisting of hydrogen, an alkyl group, a cycloalkyl group, a nuclear non-sulfonated heterocyclic group and a nuclear non-sulfonated aryl nucleus of the benzene series and Z represents hydrogen, an alkali-forming metal or an ammonium radical.

JAMES G. McNALLY.
JOSEPH B. DICKEY.